(12) United States Patent
Lee et al.

(10) Patent No.: US 12,111,781 B2
(45) Date of Patent: Oct. 8, 2024

(54) DATA BURST SUSPEND MODE USING MULTI-LEVEL SIGNALING

(71) Applicant: Micron Technology, Inc., Boise, ID (US)

(72) Inventors: Eric N. Lee, San Jose, CA (US); Leonid Minz, Beer Sheva (IL); Yoav Weinberg, Toronto (CA); Ali Feiz Zarrin Ghalam, Sunnyvale, CA (US); Luigi Pilolli, L'Aquila (IT)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 18/119,576

(22) Filed: Mar. 9, 2023

(65) Prior Publication Data
US 2023/0289306 A1 Sep. 14, 2023

Related U.S. Application Data

(60) Provisional application No. 63/318,953, filed on Mar. 11, 2022.

(51) Int. Cl.
*G06F 13/30* (2006.01)
*G06F 13/16* (2006.01)

(52) U.S. Cl.
CPC .......... *G06F 13/30* (2013.01); *G06F 13/1668* (2013.01)

(58) Field of Classification Search
CPC .............................. G06F 13/30; G06F 13/1668
See application file for complete search history.

(56) References Cited

U.S. PATENT DOCUMENTS

| 7,184,322 B2* | 2/2007 | Takahashi | G11C 5/066 365/230.02 |
| 7,716,442 B2* | 5/2010 | Herczog | G06F 13/30 710/22 |
| 2002/0012278 A1* | 1/2002 | Akaogi | G11C 7/1018 365/200 |

(Continued)

FOREIGN PATENT DOCUMENTS

WO 2021035435 A1 3/2021

OTHER PUBLICATIONS

PCT Notification of Transmittal of the International Search Report and the Written Opinion of the International Searching Authority for PCT Application No. PCT/US2023/015022, mailed Jun. 29, 2023, 9 pages.

*Primary Examiner* — Henry Tsai
*Assistant Examiner* — Christopher A Daley
(74) *Attorney, Agent, or Firm* — Lowenstein Sandler LLP (57) ABSTRACT

A memory device includes a memory array and processing logic, operatively coupled with the memory array, to perform operations including causing a data burst to be initiated by toggling a logical level of a control pin from a first level corresponding to a data burst inactive mode to a second level corresponding to a data burst active mode, wherein the data burst corresponds to a data transfer across an interface bus, causing the data burst to be suspended by toggling the logical level of the control pin from the second level to a third level corresponding to a data burst suspend mode, and causing the data burst to be resumed by toggling the logical level of the control pin from the third level to the second level.

20 Claims, 7 Drawing Sheets

(56) References Cited

U.S. PATENT DOCUMENTS

| | | | |
|---|---|---|---|
| 2005/0005035 A1* | 1/2005 | Herczog | G06F 13/30 710/22 |
| 2005/0259506 A1 | 11/2005 | Roohparvar | |
| 2013/0258755 A1 | 10/2013 | Kollipara | |
| 2021/0004337 A1 | 1/2021 | Ware | |
| 2021/0005234 A1 | 1/2021 | Galbi | |
| 2022/0398154 A1* | 12/2022 | Frank | G06F 13/28 |
| 2023/0289307 A1* | 9/2023 | Lee | G06F 13/30 |
| 2023/0367723 A1* | 11/2023 | Lee | G06F 13/32 |

* cited by examiner

DATA BURST SUSPEND MODE USING MULTI-LEVEL SIGNALING

RELATED APPLICATION

This application claims the benefit of U.S. Provisional Application 63/318,953, filed on Mar. 11, 2022 and entitled "DATA BURST SUSPEND MODE USING MULTI-LEVEL SIGNALING", the entire contents of which are incorporated by reference herein.

TECHNICAL FIELD

Embodiments of the disclosure relate generally to memory sub-systems, and more specifically, relate to implementing a data burst suspend mode using multi-level signaling.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to implementing a data burst suspend mode using multi-level signaling. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

The memory sub-system can include an interface between the memory sub-system controller and a memory device (e.g., NAND memory device) to process multiple different signals relating to one or more transfers or communications with the memory device. For example, the interface can process signals relating to memory access commands (e.g., command/address cycles) to configure the memory device to enable the transfer of raw data in connection with a memory access operation (e.g., a read operation, a program operation, etc.). The interface can implement a multiplexed interface bus including a number of bidirectional input/output (I/O) pins that can transfer address, data and instruction information between the memory sub-system controller and the memory device (e.g., local media controller and I/O control). The I/O pins can be output pins during read operations, and input pins at other times. For example, the interface bus can be an 8-bit bus (I/O [7:0]) or a 16-bit bus (I/O [15:0]).

The interface can further utilize a set of command pins to implement interface protocols. For example, the set of command pins can include a Chip Enable (CE#) pin, an Address Latch Enable (ALE) pin, a Command Latch Enable (CLE) pin, a Write Enable (WE#) pin, a Read Enable (RE#) pin, a data strobe signal (DQS) pin. Additional pins can include, for example, a write protection (WP#) pin that controls hardware write protection, and a ready/busy (RB #) pin that monitors device status and indicates the completion of a memory access operation (e.g., whether the memory device is ready or busy).

The "#" notation indicates that the CE#, WE#, #RE and WP# pins are active when set to a logical low state (e.g., 0 V), also referred to as "active-low" pins. Therefore, the ALE, CLE and DQS pins are active when set to a logical high state (e.g., greater than 0 V), also referred to as "active-high" pins. Asserting a pin can include setting the logical state of the pin to its active logical state, and de-asserting a pin can include setting the logical state of the pin to its inactive logical state. For example, an active-high pin is asserted when set to a logical high state ("driven high") and de-asserted when set to a logical low state ("driven low"), while an active-low pin is asserted when to set to a logical low state ("driven low") and de-asserted when set to a logical high state ("driven high").

CE#, WE#, RE#, CLE, ALE and WP# signals are control signals that can control read and write operations. For example, the CE# pin is an input pin that gates transfers between the host system and the memory device. For example, when the CE# pin is asserted and the memory device is not in a busy state, the memory device can accept command, data and address information. When the memory device is not performing an operation, the CE# pin can be de-asserted.

The RE# pin is an input pin that gates transfers from the memory device to the host system. For example, data can be transferred at the rising edge of RE#. The WE# pin is an input pin that gates transfers from the host system to the memory device. For example, data can be written to a data register on the rising edge of WE# when CE#, CLE and ALE are low and the memory device is not busy.

The ALE pin and the CLE pin are respective input pins. When the ALE pin is driven high, address information can be transferred from the bus into an address register of the memory device upon a low-to-high transition on the WE# pin. More specifically, addresses can be written to the address register on the rising edge of WE# when CE# and CLE are low, ALE is high, and the memory device is not busy. When address information is not being loaded, the ALE pin can be driven low. When the CLE pin is driven high, information can be transferred from the bus to a command register of the memory device. More specifically, commands can be written to the command register on the rising edge of WE# when CE# and ALE are low, CLE is high, and the memory device is not busy. When command information is not being loaded, the CLE pin can be driven low. Accordingly, a high CLE signal can indicate that a command cycle is occurring, and a high ALE signal can indicate that an address input cycle is occurring.

One type of data transfer is a data burst transfer ("data burst"), which refers to a continuous set of data input or data output transfer cycles that are performed without pause. A data burst can be initiated by specifying an initial set of parameters including a starting memory address from where to begin the data transfer, and an amount of data to be transferred. After the data burst is initiated, it runs to completion, using as many interface bus transactions as necessary to transfer the amount of data designated by the initial set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks.

To support higher speed operations, warmup cycles for data output and data input may be implemented prior to transferring data during a data burst. Warmup cycles can provide extra RE# and/or DQS transitions at the beginning of a data burst, where the extra transitions do not have any associated data. Warmup cycles can be initiated at the beginning of a corresponding data burst when warmup cycles are enabled for the corresponding data transfer type. The number of warmup cycles can be determined based on the particular memory device specification or implementation.

In some situations, while a data burst is active, a higher priority (e.g., time sensitive) request may be received by the interface bus from another device. Responsive to receiving the higher priority request, the controller can stop the data burst so that other devices can be provided with access to the interface bus. The controller can then resume the data burst after handling the higher priority request.

One way of stopping a data burst is by suspending the data burst while in a data burst suspend mode. An updated set of parameters for resuming the data burst can be saved in the memory device while the data burst is suspended. One type of data burst suspension is achieved by maintaining the RE# pin and/or DQS pin at a static logical level (e.g., high or low) during a pause period. The data burst can be resumed using the updated set of parameters to continue the data transfer. However, additional warmup cycles are not enabled upon resuming the data burst after this type of data burst suspension. Since warmup cycles can be used to support higher speed operations, this type of data burst suspension can be an ineffective way of stopping a data burst for certain memory sub-system implementations that utilize high data transfer rates.

As an alternative to the data burst suspension described above, the memory sub-system controller can exit the data burst while in a data burst exit mode. A data burst can be terminated by toggling at least one of the CE# pin, ALE pin or the CLE pin high during the data burst. For example, toggling any of these pins high can generate a notification to the local media controller (e.g., NAND controller) that the data burst is being exited. When all of these signals are toggled back to low, the data burst is entered again, and the local media controller knows to institute warmup cycles. Therefore, in contrast to data burst suspension, warmup cycles can be re-enabled by the local media controller upon resuming the data burst after an exit. However, since the data burst is exited and resumed using the CE# pin, CLE pin and/or ALE pin, these pins cannot be used for purposes beyond data burst exit and resume control (e.g., data burst queue control). Accordingly, although data burst exiting allows for warmup cycles prior to resuming the data burst, data burst exiting can monopolize pin resources.

Aspects of the present disclosure address the above and other deficiencies by implementing a data burst suspend mode using multi-level signaling. Embodiments described herein can enable a data burst suspend mode protocol with warmup cycles without utilizing extra pin resources. For example, the multi-level signaling can be used to toggle three voltage and logical levels ("levels") with respect to a pin (e.g., CE# pin), where each of the signals corresponds to one of a data burst inactive mode, a data burst active mode, and a data burst suspend mode. For example, the data burst inactive mode can correspond to a first level, the data burst active mode can correspond to a second level and the data burst suspend mode can correspond to a third level.

In some embodiments, the second level has a voltage magnitude between the first and third levels. For example, the first level can be a high level, the second level can be a medium level, and the third level can be a low level. More specifically, the first level can be a higher voltage level than the second level, and the second level can be a higher voltage level than the third level. Illustratively, the first level can range from about 0.9 V to about 1.2 V, the second level can range from about 0.45 V to about 0.7 V, and the third level can range from about 0 V to about 0.25 V. The local media controller (e.g., NAND I/O receiver) can check signals above to below a 0.375 V level and above or below as 0.8 V level. These two indications can be combined to identify the current mode.

As another example, the first level can be a low level, the second level can be a medium level, and the third level can be a high level. More specifically, the first level can be a lower voltage level than the second level, and the second level can be a lower voltage level than the third level. Illustratively, the first level can range from about 0 V to about 0.25 V, the second level can range from about 0.45 V to about 0.7 V, and the third level can range from about 0.9 V to about 1.2 V.

In some embodiments, the multi-level signaling implements pulse-amplitude modulation (PAM) signaling (e.g., PAM3 signaling). Accordingly, the multi-level signaling described herein can enable data burst suspension while retaining warmup cycles upon resuming of the data burst from suspension, and can reduce pin resource waste attributable to data burst exit.

Advantages of the present disclosure include, but are not limited to, improved memory device performance and resource efficiency.

Figure 1A:
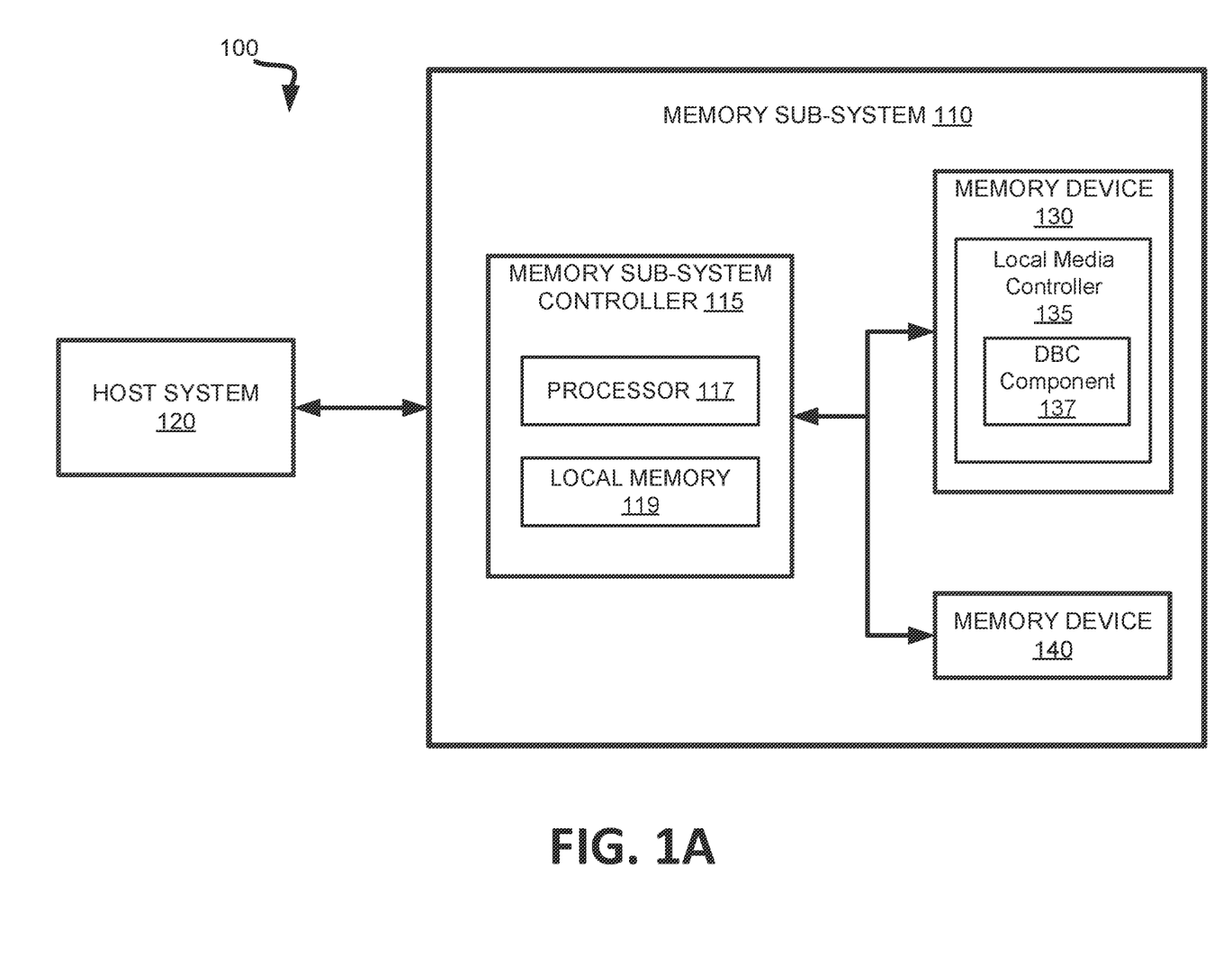
FIG. 1A illustrates an example computing system that includes a memory sub-system, in accordance with some embodiments of the present disclosure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement a data burst control (DBC) component 137 that can implement a data burst suspend mode using multi-level signaling. The DBC component 137 can enable a data burst suspend mode protocol with warmup cycles without utilizing extra pin resources. For example, the multi-level signaling can be used to toggle three voltage and logical levels ("levels") with respect to a pin (e.g., CE# pin), where each of the signals corresponds to one of a data burst active mode, a data burst suspend mode, and a data burst inactive mode. For example, the data burst inactive mode can correspond to a first level, the data burst active mode can correspond to a second level and the data burst suspend mode can correspond to a third level. In some embodiments, the second level has a voltage magnitude between the first and third levels. For example, the first level can be a high level, the second level can be a medium level, and the third level can be a low level. More specifically, the first level can be a higher voltage level than the second level, and the second level can be a higher voltage level than the third level. As another example, the first level can be a low level, the second level can be a medium level, and the third level can be a high level. More specifically, the first level can be a lower voltage level than the second level, and the second level can be a lower voltage level than the third level. In some embodiments, the multi-level signaling implements pulse-amplitude modulation (PAM) signaling (e.g., PAM3 signaling).

Figure 1B:
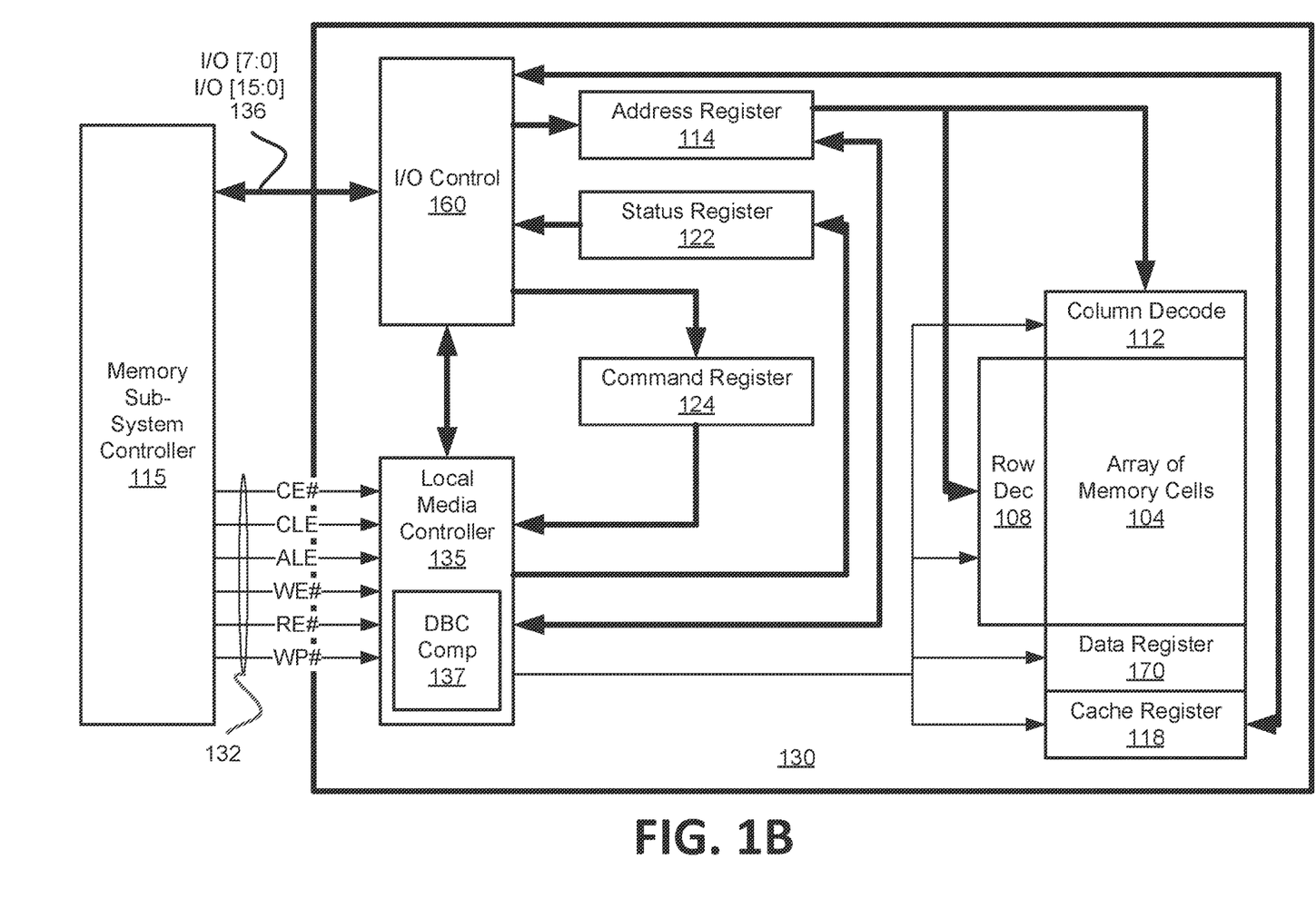
FIG. 1B is a block diagram of a memory device in communication with a memory sub-system controller of a memory sub-system, in accordance with some embodiments of the present disclosure.

Illustratively, a data burst can follow a command to access the memory device (e.g., a particular die of the memory device), and the CE# pin can be driven from the first level (e.g., high level) to the second level (e.g., medium level). The data burst can be suspended by driving the CE# pin from the second level to the third level. The data burst can then be resumed with warmup cycles by toggling the CE# pin from the third level to the second level. The data burst can be exited or terminated by driving the CE# pin from the medium level to the high level. Further details regarding implementing a data burst suspend mode using multi-level signaling are described below with reference to FIGS. 2-3.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline).

A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 112 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 112 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 112 to control the row decode circuitry 108 and column decode circuitry 112 in response to the addresses. In one embodiment, local media controller 135 includes the DBC component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
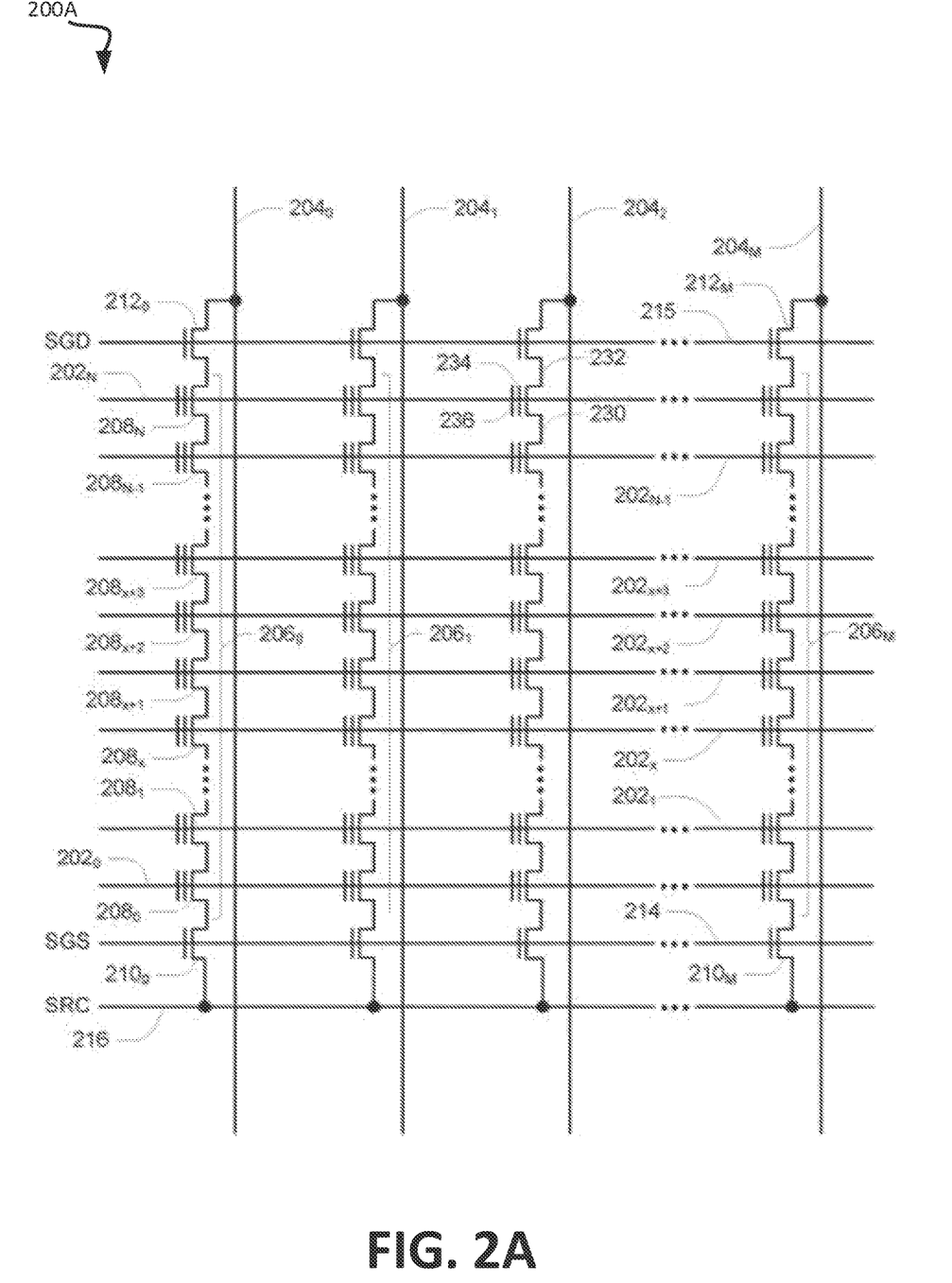
FIGS. 2A-2C are diagrams of portions of an example array of memory cells included in a memory device, in accordance with some embodiments of the present disclosure.
Figure 2B:
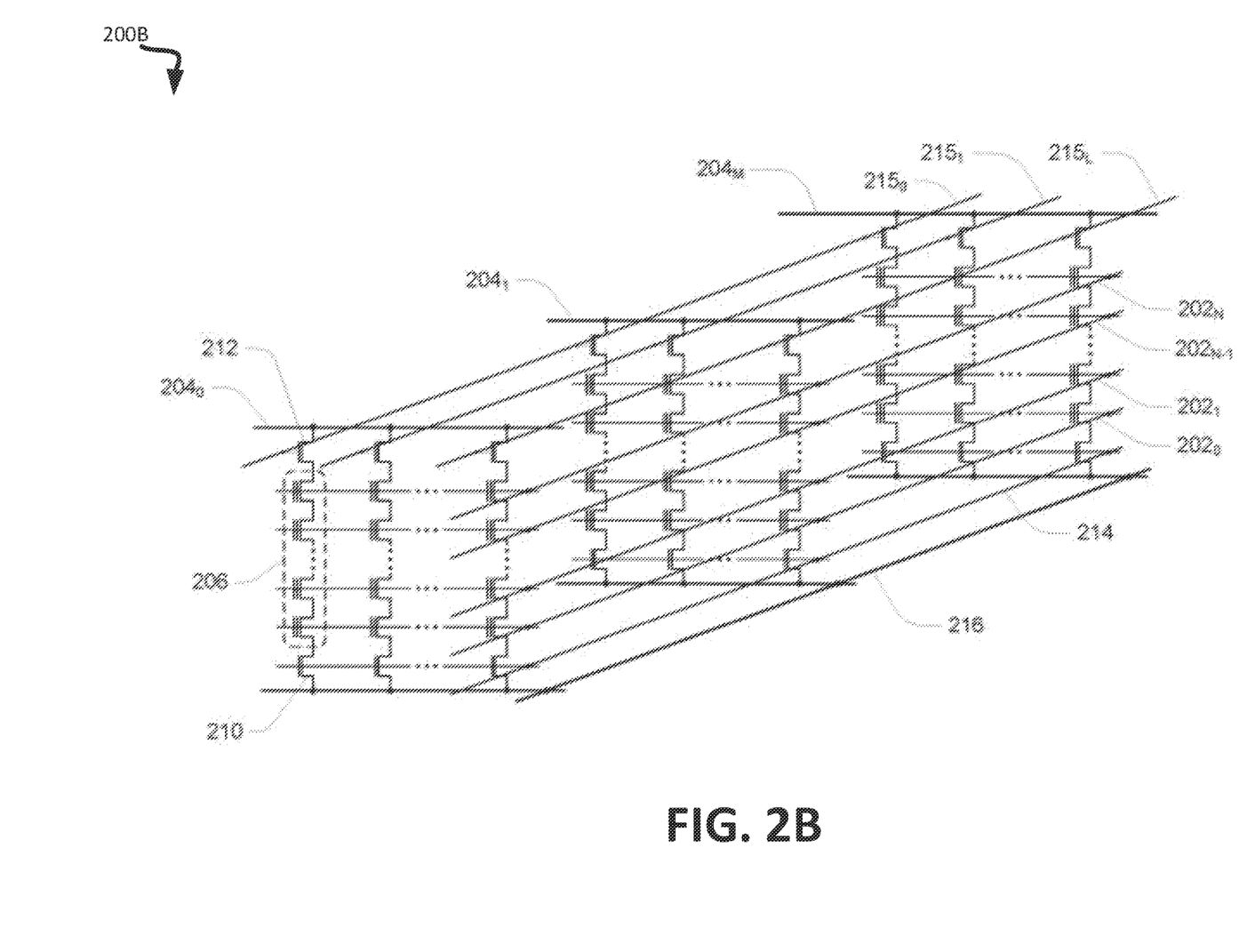
Figure 2C:
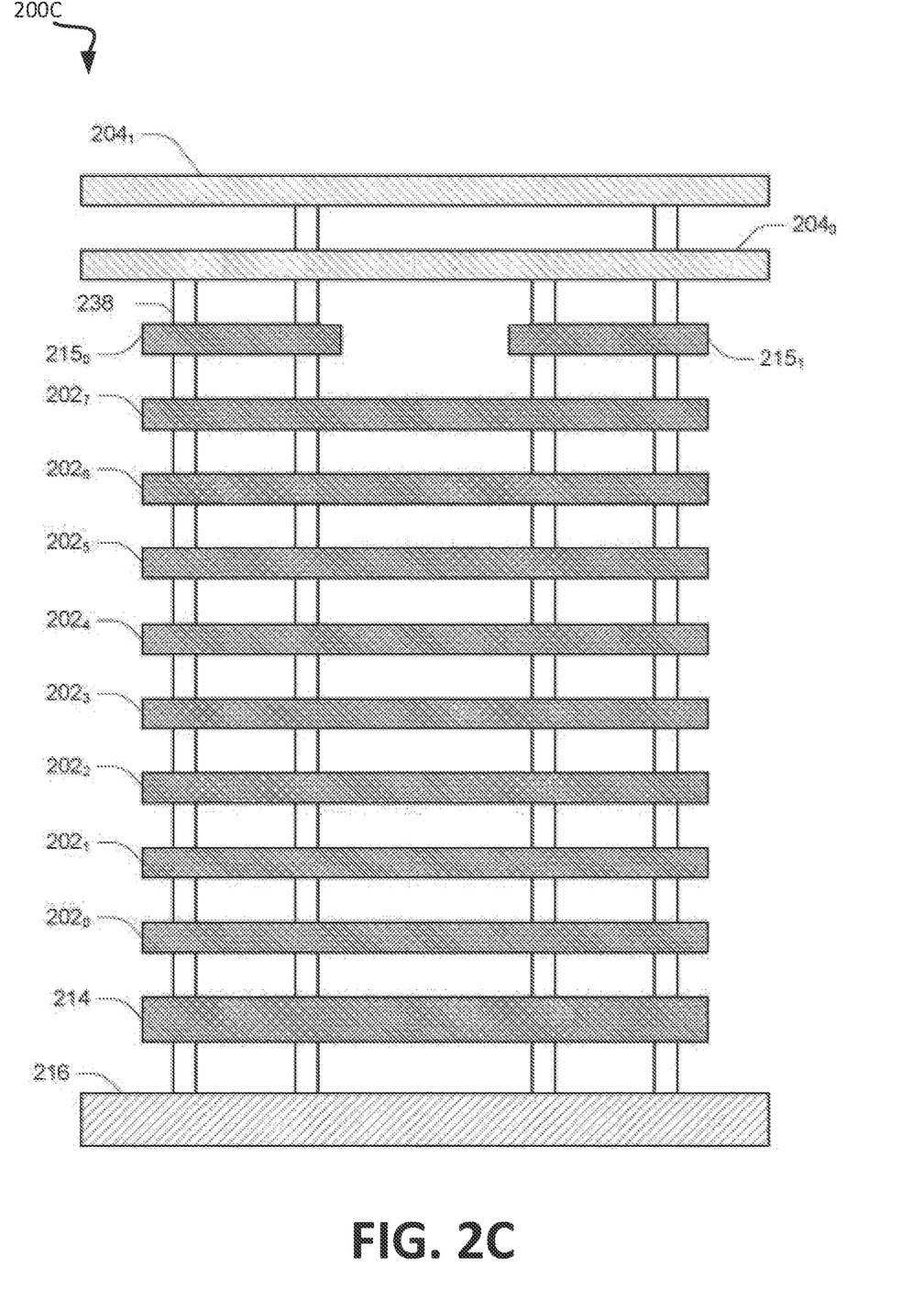

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines 204$_0$, 204$_2$, 204$_4$, etc.) may be one physical page of memory cells 208 (e.g., even memory cells) while memory cells 208 commonly connected to wordline 202$_N$ and selectively connected to odd bitlines 204 (e.g., bitlines 204$_1$, 204$_3$, 204$_5$, etc.) may be another physical page of memory cells 208 (e.g., odd memory cells). Although bitlines 204$_3$-204$_5$ are not explicitly depicted in FIG. 2A, it is apparent from the figure that the bitlines 204 of the array of memory cells 200A may be numbered consecutively from bitline 204$_0$ to bitline 204$_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines 202$_0$-202$_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings 206$_0$ to 206$_M$. Each string 206 can be connected (e.g., selectively connected) to a source line 216 (SRC) and can include memory cells 208$_0$ to 208$_N$. The memory cells 208 of each string 206 can be connected in series between a select gate 210, such as one of the select gates 210$_0$ to 210$_M$, and a select gate 212, such as one of the select gates 212$_0$ to 212$_M$. In some embodiments, the select gates 210$_0$ to 210$_M$ are source-side select gates (SGS) and the select gates 212$_0$ to 212$_M$ are drain-side select gates. Select gates 210$_0$ to 210$_M$ can be connected to a select line 214 (e.g., source-side select line) and select gates 212$_0$ to 212$_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell 208$_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell 208$_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line 204$_0$-204$_M$ by a select gate 212 and to the SRC 216 by a select gate 210. Multiple strings 206 can be selectively connected to the same bitline 204. Subsets of strings 206 can be connected to their respective bitlines 204 by biasing the select lines 215$_0$-215$_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) 238 represent the channel regions of different strings of series-connected memory cells (e.g., strings 206 of FIGS. 2A-2B) selectively connected to the bitline 204$_0$ and/or the bitline 204$_1$. A memory cell (not depicted in FIG. 2C) may be formed at each intersection of a wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
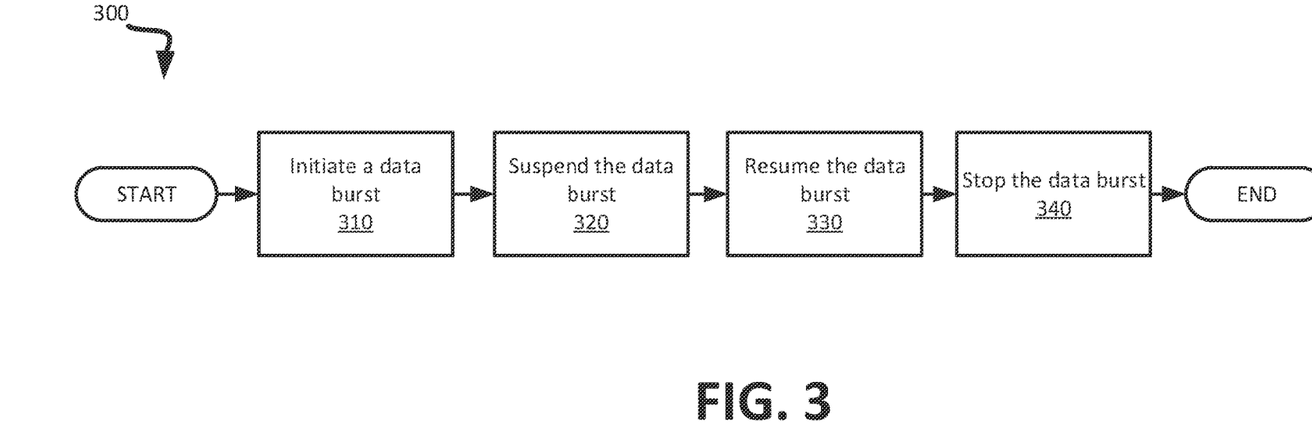
FIG. 3 is a flow diagram of a method to implement a data burst suspend mode using multi-level signaling, in accordance with some embodiments of the present disclosure.

FIG. 3 is a flow diagram of an example method 300 to implement a data burst suspend mode using multi-level signaling, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the DBC component 137 of FIGS. 1A-1B. In some embodiments, the multi-level signaling implements PAM signaling (e.g., PAM3 signaling).

At operation 310, a data burst is initiated. For example, processing logic can cause a memory sub-system (e.g., the memory sub-system 110 of FIGS. 1A-1B) to enter a data burst active mode ("active mode") in response to receiving a command accessing a memory device. The data burst can transfer data over an interface bus operatively coupled to the memory device. The command and data burst can each correspond to a particular die of the memory device. The data burst can be a data input burst or a data output burst. Initiating the data burst can include toggling a logical level ("level") of a pin to a level corresponding to the active mode. For example, the pin can be a CE# pin, as described above with reference to FIG. 1B.

In some embodiments, logical level is toggled from a level corresponding to a data burst inactive mode ("inactive mode") in which the data burst is not active. That is, the data burst is not being resumed from a suspended state. In some embodiments, the logical level is toggled from a level corresponding to a data burst suspend mode ("suspend mode") in which the data burst is suspended. That is, initiating the data burst includes resuming the data burst.

At operation 320, the data burst is suspended. For example, the processing logic can cause the memory sub-system to enter the suspend mode. In some embodiments, the data burst is suspended in response to the interface bus receiving a priority request having a higher priority (e.g., time sensitive request). Suspending the data burst can include toggling the level of the pin from the level corresponding to the active mode to the level corresponding to the suspend mode. In some embodiments, the level corresponding to the active mode has a voltage magnitude between the level corresponding to the inactive mode and level corresponding to the suspend mode.

For example, the level corresponding to the inactive mode can be a high level, and the level corresponding to the suspend mode can be a low level (e.g., 0 V), such that the level corresponding to the active mode is a medium level between the high level and the low level. Illustratively, the level corresponding to the inactive mode can range from about 0.9 V to about 1.2 V, the level corresponding to the active mode can range from about 0.45 V to about 0.7 V, and the level corresponding to the suspend mode can range from about 0 V to about 0.25 V.

As another example, the level corresponding to the inactive mode can be a low level, and the level corresponding to the suspend mode can be a high level, such that the level corresponding to the data burst active mode is a medium level between the high level and the low level. Illustratively, the level corresponding to the inactive mode can range from about 0 V to about 0.25 V, the level corresponding to the active mode can range from about 0.45 V to about 0.7 V, and the level corresponding to the suspend mode can range from about 0.9 V to about 1.2 V.

At operation 330, the data burst is resumed. For example, the processing logic can cause the memory sub-system to reenter the active mode in response to receiving an indication to resume the data burst. Illustratively, the indication can correspond to a completion of the priority request. Resuming the data burst can include toggling the level of the pin from the level corresponding to the suspend mode to the level corresponding to the active mode.

At operation 340, the data burst is stopped. For example, the processing logic can cause the memory sub-system to stop the data burst. In some embodiments, causing the memory sub-system to stop the data burst includes causing the data burst to exit. For example, causing the data burst to exit can include toggling the level of the pin from the level corresponding to the active mode to the level corresponding to the inactive mode.

In some embodiments, causing the memory sub-system to stop the data burst includes causing the data burst to be terminated. For example, the data burst can be terminated in response to receiving a request to terminate the data burst.

Figure 4:
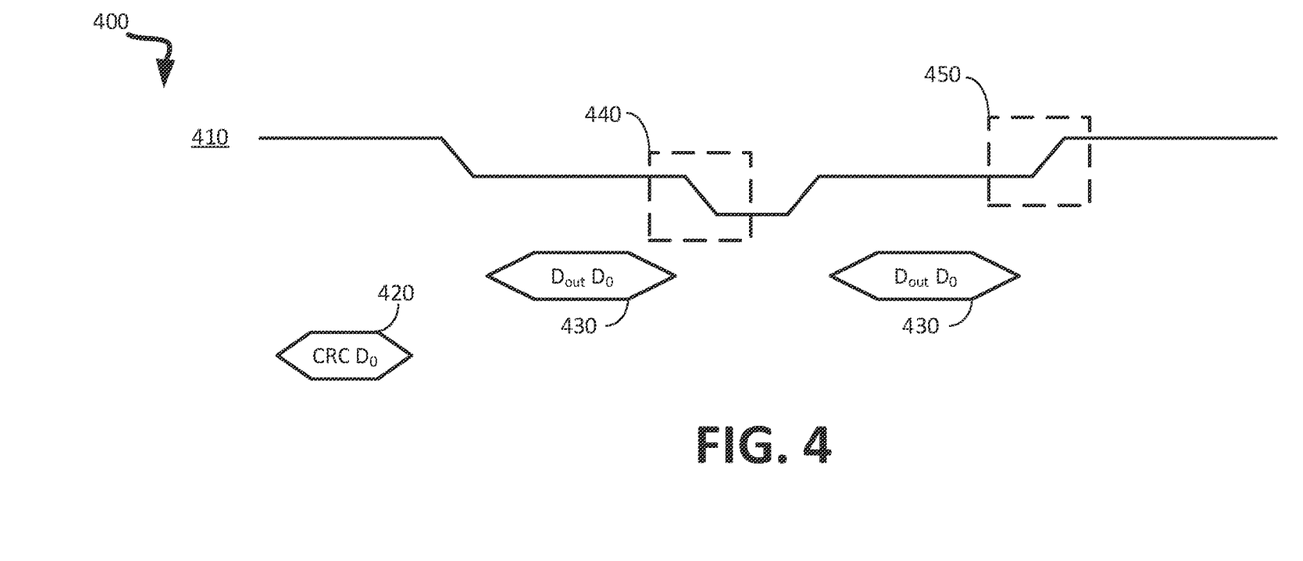
FIG. 4 is a diagram illustrating an example implementation of a data burst suspend mode using multi-level signaling, in accordance with some embodiments of the present disclosure.

FIG. 4 is a diagram 400 illustrating an example implementation of a data burst suspend mode using multi-level signaling, in accordance with some embodiments of the present disclosure. More specifically, the diagram 400 illustrates the how a logical level 410 of a pin changes to control data burst. In some embodiments, the pin is a CE# pin.

As shown, a command 420 is received at some point in time while data burst inactive mode is set. For example, the logical level 410 is a high level while data burst inactive mode is set. In this illustrative example, the command 420 is shown as a change read column (CRC) command to change a die 0 ($D_0$) read column (CRC $D_0$) of the memory device. However, the command 420 can be any suitable memory access command. In response to receiving the command 420, the logical level 410 is toggled from the high level to a medium level to set a data burst active mode, and a data burst 430 is initiated. In this illustrative example, the data burst 430 is a data output burst with respect to $D_0$ ($D_{out}$ $D_0$). However, the data burst 400 can be also be a data input burst.

At some point after initiating the data burst 430, as indicated by region 440, the data logical level 410 is toggled from the medium level to a low level to set a data burst suspend mode, and the data burst 430 is suspended. At some point after the data burst 430 is suspended, the logical level 410 is toggled from the low level to the medium level to reset the data burst active mode, and the data burst 430 is resumed. By suspending the data burst 430 utilizing the multi-level signaling described herein, as opposed to other techniques such as maintaining the logical level of the RE#/DQS pins static, the data burst 430 can be resumed with warmup cycles.

At some point after the data burst 400 is resumed, as indicated by region 450, the logical level 410 is toggled from the medium level to the high level to terminate the data burst 430. For example, the data burst 430 can be terminated in response to completing the data transfer specified by the data burst 430.

Figure 5:
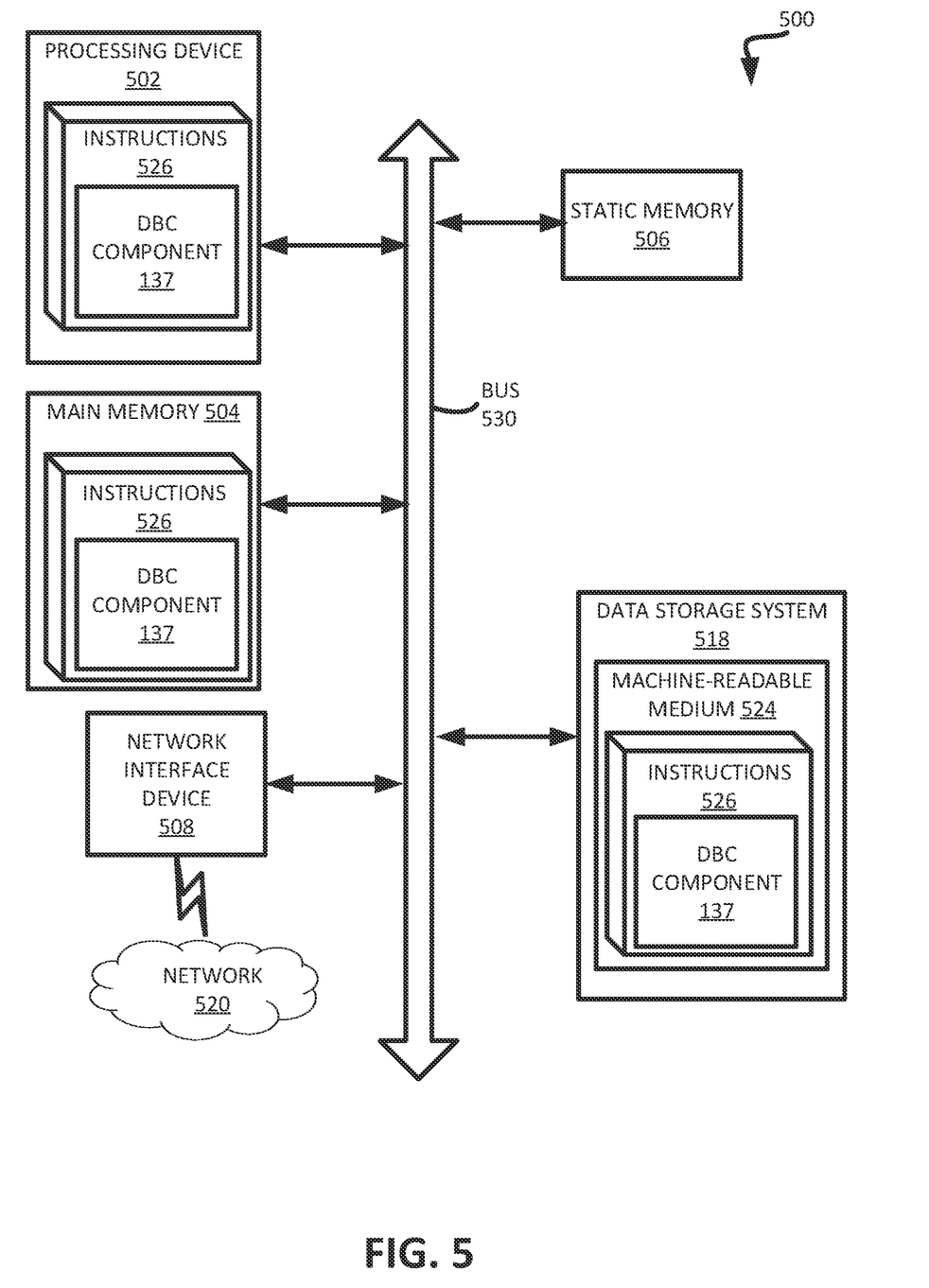
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the DBC component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 404 can correspond to the memory sub-system 110 of FIG. 1A.

In one embodiment, the instructions 526 include instructions to implement functionality corresponding to a DBC component (e.g., the DBC component 137 of FIG. 1A). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a memory array; and
   processing logic, operatively coupled with the memory array, to perform operations comprising:
      causing a data burst to be initiated by toggling a logical level of a control pin from a first level corresponding to a data burst inactive mode to a second level corresponding to a data burst active mode, wherein the data burst corresponds to a data transfer across an interface bus;
      causing the data burst to be suspended by toggling the logical level of the control pin from the second level to a third level corresponding to a data burst suspend mode; and
      causing the data burst to be resumed by toggling the logical level of the control pin from the third level to the second level.

2. The memory device of claim 1, wherein the control pin is a chip enable pin.

3. The memory device of claim 1, wherein the second level has a voltage magnitude between the first level and the third level.

4. The memory device of claim 3, wherein the first level is a higher voltage level than the second level, and wherein the second level is a higher voltage level than the third level.

5. The memory device of claim 3, wherein the first level is a lower voltage level than the second level, and wherein the second level is a lower voltage level than the third level.

6. The memory device of claim 1, wherein:
the data burst is initiated in response to receiving a command accessing the memory device;
the data burst is suspended in response to receiving a priority request; and
the data burst is resumed in response to receiving an indication to resume the data burst corresponding to a completion of the priority request.

7. The memory device of claim 1, wherein the operations further comprise causing the data burst to exit by toggling the logical level of the pin from the second level to the first level.

8. The memory device claim 1, wherein the operations further comprise:
receiving a command to terminate the data burst; and
in response to receiving the command to be terminated, causing the data burst to be terminated.

9. A method comprising:
causing, by a processing device, a data burst to be initiated by toggling a logical level of a control pin from a first level corresponding to a data burst inactive mode to a second level corresponding to a data burst active mode, wherein the data burst corresponds to a data transfer across an interface bus;
causing, by the processing device, the data burst to be suspended by toggling the logical level of the control pin from the second level to a third level corresponding to a data burst suspend mode; and
causing, by the processing device, the data burst to be resumed by toggling the logical level of the control pin from the third level to the second level.

10. The method of claim 9, wherein the control pin is a chip enable pin.

11. The method of claim 9, wherein the second level has a voltage magnitude between the first level and the third level.

12. The method of claim 11, wherein the first level is a higher voltage level than the second level, and wherein the second level is a higher voltage level than the third level.

13. The method of claim 9, wherein:
the data burst is initiated in response to receiving a command accessing the memory device;
the data burst is suspended in response to receiving a priority request; and
the data burst is resumed in response to receiving an indication to resume the data burst corresponding to a completion of the priority request.

14. The method of claim 9, further comprising causing, by the processing device, the data burst to exit by toggling the logical level of the pin from the second level to the first level.

15. The method of claim 9, further comprising:
receiving, by the processing device, a command to terminate the data burst; and
in response to receiving the command to be terminated, causing, by the processing device, the data burst to be terminated.

16. A non-transitory computer-readable storage medium comprising instructions that, when executed by a processing device, cause the processing device to perform operations comprising:
causing, during a data burst suspend mode, a data burst to be resumed by toggling a logical level of a control pin from a first level corresponding to the data burst suspend mode to a second level corresponding to a data burst active mode, wherein the data burst corresponds to a data transfer across an interface bus; and
causing the data burst to exit by toggling the logical level of the control pin from the second level to a third level corresponding to a data burst inactive mode.

17. The non-transitory computer-readable storage medium of claim 16, wherein the control pin is a chip enable pin.

18. The non-transitory computer-readable storage medium of claim 16, wherein the second level has a voltage magnitude between the first level and the third level.

19. The non-transitory computer-readable storage medium of claim 18, wherein the first level is a higher voltage level than the second level, and wherein the second level is a higher voltage level than the third level.

20. The non-transitory computer-readable storage medium of claim 16, wherein the operations further comprise, prior to causing the data burst to be resumed, causing the data burst to be suspended by toggling the logical of the control pin from the second level to the first level.

* * * * *